(12) United States Patent
Ke et al.

(10) Patent No.: US 8,457,015 B2
(45) Date of Patent: Jun. 4, 2013

(54) METHOD OF CONFIGURING THE ABSOLUTE GRANT MAPPING TABLE FOR BASE STATION

(75) Inventors: Yazhu Ke, Shenzhen (CN); Qiang You, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 377 days.

(21) Appl. No.: 12/746,678

(22) PCT Filed: Dec. 10, 2007

(86) PCT No.: PCT/CN2007/003503
§ 371 (c)(1), (2), (4) Date: Jun. 7, 2010

(87) PCT Pub. No.: WO2009/079812
PCT Pub. Date: Jul. 2, 2009

(65) Prior Publication Data
US 2010/0278074 A1    Nov. 4, 2010

(51) Int. Cl.
*H04W 4/00* (2009.01)
*H04B 7/00* (2006.01)
*H04B 7/216* (2006.01)

(52) U.S. Cl.
USPC ............ 370/254; 370/329; 370/335; 455/517

(58) Field of Classification Search
USPC ................ 370/254–328, 338–355, 468–469; 375/236–259; 455/452–522
See application file for complete search history.

(56) References Cited

U.S. PATENT DOCUMENTS

| | | | | |
|---|---|---|---|---|
| 7,480,269 B2 * | 1/2009 | Heo et al. | | 370/328 |
| 7,496,075 B2 * | 2/2009 | Kwak et al. | | 370/335 |
| 7,630,733 B2 * | 12/2009 | Usuda et al. | | 455/522 |
| 7,688,796 B2 * | 3/2010 | Pan et al. | | 370/342 |
| 7,817,598 B2 * | 10/2010 | Usuda et al. | | 370/329 |
| 7,991,415 B2 * | 8/2011 | Usuda et al. | | 455/517 |
| 8,238,892 B2 * | 8/2012 | Booker et al. | | 455/420 |
| 2006/0281417 A1 * | 12/2006 | Umesh et al. | | 455/69 |

(Continued)

FOREIGN PATENT DOCUMENTS

| | | |
|---|---|---|
| CN | 1829388 A | 9/2006 |
| CN | 1842217 A | 10/2006 |
| CN | 1921336 A | 2/2007 |
| EP | 1758318 A2 | 2/2007 |

OTHER PUBLICATIONS

International Search Report for PCT/CN2007/003503, Prepared by the Chinese Patent Office, Dated Sep. 8, 2008, 4 Pages.

*Primary Examiner* — M. Phan
(74) *Attorney, Agent, or Firm* — Brooks Kushman P.C.

(57) ABSTRACT

A method for configuring an absolute grant mapping relationship table for a base station, comprises: a radio network controller notifying the base station of the absolute grant mapping relationship table used by an enhanced dedicated channel absolute grant channel (E-AGCH) through a signaling, and the base station returning a response message to the radio network controller after storing the configured information. The present invention allows the absolute grant mapping relationship table used by the base station to be consistent with an absolute grant mapping relationship table of which a user equipment is notified via the air interface to use, so as to ensure that the absolute grant values corresponding to the base station and the user equipment are obtained from the same absolute grant mapping relationship table, and allocation and use of the power resource by the base station and the user equipment are consistent.

7 Claims, 1 Drawing Sheet

U.S. PATENT DOCUMENTS

2007/0002801 A1* 1/2007 Usuda et al. .................. 370/333
2007/0047501 A1* 3/2007 Usuda et al. .................. 370/335
2007/0066339 A1* 3/2007 Usuda et al. .................. 455/522
2008/0186928 A1* 8/2008 Usuda et al. .................. 370/338

* cited by examiner

METHOD OF CONFIGURING THE ABSOLUTE GRANT MAPPING TABLE FOR BASE STATION

CROSS-REFERENCE TO RELATED APPLICATION

This application is the U.S. national phase of PCT Appln. No. PCT/CN2007/003503 filed Dec. 10, 2007, the disclosure of which is incorporated in its entirety by reference herein.

TECHNICAL FIELD

The present invention relates to the field of a wireless communication system, and more particularly, to a method for configuring an absolute grant mapping relationship table usable by an enhanced dedicated channel (E-DCH) absolute grant channel (E-AGCH) for a base station.

TECHNICAL BACKGROUND

In technical optimization of existing systems, in order to improve the quality of user experiences and throughput of the systems, the high-speed uplink packet access technology is evolved continuously and at present a high order modulation mode of 16QAM has been introduced. The introduction of the high order modulation of 16QAM allows a user to transmit data at a higher rate. Accordingly, higher power is required to meet requirements of service quality, which causes a great change in the method of uplink power control as well as the method for a base station to determine a grant.

There are two methods for the base station to determine a grant: one is absolute grant and the other is relative grant. The grant method, whether absolute or relative, in fact is that the base station indicates an available power resource (which may corresponds to a grant value) to a user equipment based on various factors, such as allocable resources of the cell, channel quality indication of the user, size of the requested data etc., and notifies the user by an index or by way of relative rising/lowering, then the user equipment determines a rate at which data may be transmitted according to the power resource. It can be seen that the base station needs to know explicitly a corresponding relationship between the index and the grant value so as to ensure that the user equipment determines a rate at which data may be transmitted within an upper limit of power that the base station expects the user equipment to transmit.

After 16QAM is introduced, the previously defined corresponding relationships between indexes and grant values (powers) are no longer able to meet requirements. Thus, the $3^{rd}$ Generation Partnership Project (3GPP) protocol introduces new tables of corresponding relationships between indexes and grant values for absolute grant and relative grant respectively, i.e., introduces higher grant values to meet the requirements for higher rate. At present, as specified in the protocol, there are two absolute grant mapping relationship tables usable by the E-AGCH channel. As illustrated in Table 1 and Table 2, a mapping table of absolute grant values, which is a table of relationships between absolute grant values and indexes before the introduction of 16QAM, is shown in Table 1, and a self-adapting mapping table of absolute grant values, which is a table of relationships between absolute grant values and indexes after the introduction of 16QAM, is shown in Table 2. Content of each of the tables contains two items: index numbers and absolute grant values.

TABLE 1

Mapping table of absolute grant values

| Absolute Grant Value | Index |
|---|---|
| $(168/15)^2 \times 6$ | 31 |
| $(150/15)^2 \times 6$ | 30 |
| $(168/15)^2 \times 4$ | 29 |
| $(150/15)^2 \times 4$ | 28 |
| $(134/15)^2 \times 4$ | 27 |
| $(119/15)^2 \times 4$ | 26 |
| $(150/15)^2 \times 2$ | 25 |
| $(95/15)^2 \times 4$ | 24 |
| $(168/15)^2$ | 23 |
| $(150/15)^2$ | 22 |
| $(134/15)^2$ | 21 |
| $(119/15)^2$ | 20 |
| $(106/15)^2$ | 19 |
| $(95/15)^2$ | 18 |
| $(84/15)^2$ | 17 |
| $(75/15)^2$ | 16 |
| $(67/15)^2$ | 15 |
| $(60/15)^2$ | 14 |
| $(53/15)^2$ | 13 |
| $(47/15)^2$ | 12 |
| $(42/15)^2$ | 11 |
| $(38/15)^2$ | 10 |
| $(34/15)^2$ | 9 |
| $(30/15)^2$ | 8 |
| $(27/15)^2$ | 7 |
| $(24/15)^2$ | 6 |
| $(19/15)^2$ | 5 |
| $(15/15)^2$ | 4 |
| $(11/15)^2$ | 3 |
| $(7/15)^2$ | 2 |
| ZERO_GRANT* | 1 |
| INACTIVE* | 0 |

TABLE 2

Self-adapting mapping table of absolute grant values

| Absolute Grant Value | Index |
|---|---|
| $(377/15)^2 \times 4$ | 31 |
| $(237/15)^2 \times 6$ | 30 |
| $(168/15)^2 \times 6$ | 29 |
| $(150/15)^2 \times 6$ | 28 |
| $(168/15)^2 \times 4$ | 27 |
| $(150/15)^2 \times 4$ | 26 |
| $(134/15)^2 \times 4$ | 25 |
| $(119/15)^2 \times 4$ | 24 |
| $(150/15)^2 \times 2$ | 23 |
| $(95/15)^2 \times 4$ | 22 |
| $(168/15)^2$ | 21 |
| $(150/15)^2$ | 20 |
| $(134/15)^2$ | 19 |
| $(119/15)^2$ | 18 |
| $(106/15)^2$ | 17 |
| $(95/15)^2$ | 16 |
| $(84/15)^2$ | 15 |
| $(75/15)^2$ | 14 |
| $(67/15)^2$ | 13 |
| $(60/15)^2$ | 12 |
| $(53/15)^2$ | 11 |
| $(47/15)^2$ | 10 |
| $(42/15)^2$ | 9 |
| $(38/15)^2$ | 8 |
| $(34/15)^2$ | 7 |
| $(30/15)^2$ | 6 |
| $(27/15)^2$ | 5 |
| $(24/15)^2$ | 4 |
| $(19/15)^2$ | 3 |
| $(15/15)^2$ | 2 |
| ZERO_GRANT* | 1 |
| INACTIVE* | 0 |

According to the current 3GPP protocol, the user equipment is notified via the air interface only of which absolute grant mapping relationship table to use, but the user equipment is not notified at the Node B application part (NBAP) interface, and there is no explicit specification either, such that the absolute grant values corresponding to the base station and the user equipment are obtained from different absolute grant value and index relationship tables, thereby resulting in inconsistency between allocation and use of the power resource by the base station and the user equipment, and eventually resulting in overload or reduced throughput of the system due to insufficient use of the usable power resource by the user equipment.

SUMMARY OF THE INVENTION

The technical problem to be solved by the present invention is to provide a method for configuring an absolute grant mapping relationship table for a base station, in order to ensure efficient utilization of resources and security of the system.

In order to solve the technical problem described above, the present invention provides a method for configuring an absolute grant mapping relationship table for a base station, comprising:

a radio network controller notifying the base station of the absolute grant mapping relationship table used by an enhanced dedicated channel absolute grant channel (E-AGCH) through a signaling; and the base station returning a response message to the radio network controller after storing the configured information.

Further, the method may have the following features: the absolute grant mapping relationship table is consistent with an absolute grant mapping relationship table used by the E-AGCH, of which a user equipment is notified via an air interface.

Further, the method may have the following features: the signaling sent by the radio network controller is a radio link setup request message or a radio link addition request message, and the base station sends a radio link setup response message or a radio link addition response message to the radio network controller after receiving the radio link setup request message or the radio link addition request message.

Further, the method may have the following features: the signaling sent by the radio network controller is a radio link reconfiguration preparation message, and the base station sends a radio link reconfiguration readiness message to the radio network controller after receiving the radio link reconfiguration preparation message.

Further, the method may have the following features: the signaling sent by the radio network controller is a radio link reconfiguration request message, and the base station sends a radio link reconfiguration response to the radio network controller after receiving the radio link reconfiguration request message.

Further, the method may have the following features: notifying the base station of the absolute grant mapping relationship table used by the E-AGCH is implemented by including an identification number of the absolute grant mapping relationship table in the signaling, and the identification number is used to identify the absolute grant mapping relationship table used by the user equipment.

Further, the method may have the following features: a value range of the identification number of the absolute grant mapping relationship table is 0~1.

Further, the method may have the following features: content of the absolute grant mapping relationship table includes two items: index numbers and the corresponding absolute grant values.

Further, the method may have the following features: the absolute grant mapping relationship table is an absolute grant value and index relationship table before or after the introduction of 16QAM.

It can be seen from the above that the present invention allows the absolute grant mapping relationship table used by the base station to be consistent with an absolute grant mapping relationship table of which a user equipment is notified via the air interface to use, so as to ensure that the absolute grant values corresponding to the base station and the user equipment are obtained from the same absolute grant mapping relationship table, i.e., the same absolute grant value and index relationship table, such that allocation and use of the power resource by the base station and the user equipment are consistent, thereby ensuring efficient utilization of resources and security of the system.

PREFERRED EMBODIMENTS OF THE INVENTION

The main conception of the present invention is that a radio network controller configures an absolute grant mapping relationship table for a base station (the configuration is directed to a user equipment) and let the configured absolute grant mapping relationship table be consistent with an absolute grant mapping relationship table of which the user equipment is notified via the air interface to use, so as to ensure that absolute grant values corresponding to the base station and the user equipment are obtained from the same absolute grant mapping relationship table, i.e., the same absolute grant value and index relationship table, such that allocation and use of the power resource by the base station and the user equipment are consistent, thereby ensuring efficient utilization of resources and security of the system.

The radio network controller may notify the base station of the absolute grant mapping relationship table usable by the E-AGCH through a signaling. The signaling may be any of the following messages: radio link setup request, radio link reconfiguration preparation, radio link reconfiguration request and radio link addition request. The absolute grant mapping relationship table may by represented by its identification number. The value of index number in the absolute grant mapping relationship table may increase progressively, starting from 0 or 1.

The technical scheme of the present invention will be described in detail below in conjunction with the drawings and embodiments.

The First Embodiment

Figure 1:
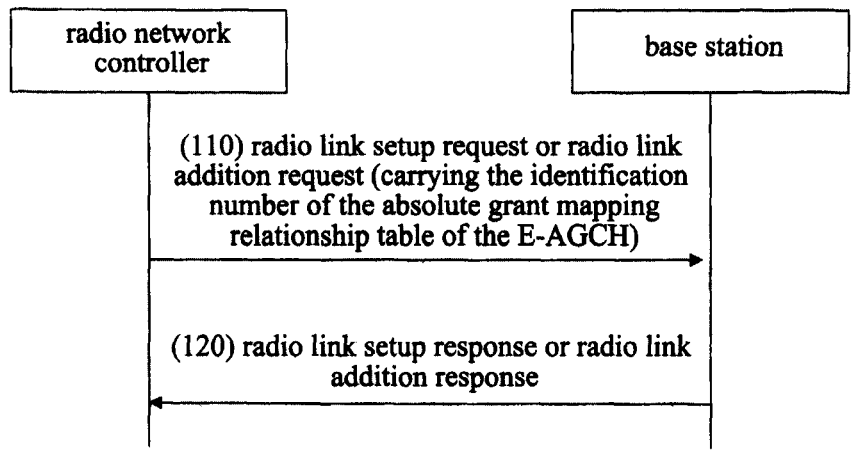
FIG. 1 illustrates a schematic diagram of a method for configuring an absolute grant mapping relationship table for a base station in accordance with the first embodiment of the present invention.

In this embodiment, a radio network controller notifies a base station of an absolute grant mapping relationship table usable by an E-AGCH through a radio link setup request or a radio link addition request, as shown in FIG. 1:

step 110: the radio network controller sends a radio link setup request message or radio link addition request message, which carries the identification number of the absolute grant mapping relationship table usable by the E-AGCH, to the base station, where the identification number of the absolute grant mapping relationship table is consistent with that of an absolute grant mapping relationship table of which a user equipment is notified via the air interface to use; and step 120: the base station stores the configured information and sends a radio link setup response message or a radio link addition response message to the radio network controller.

The Second Embodiment

Figure 2:
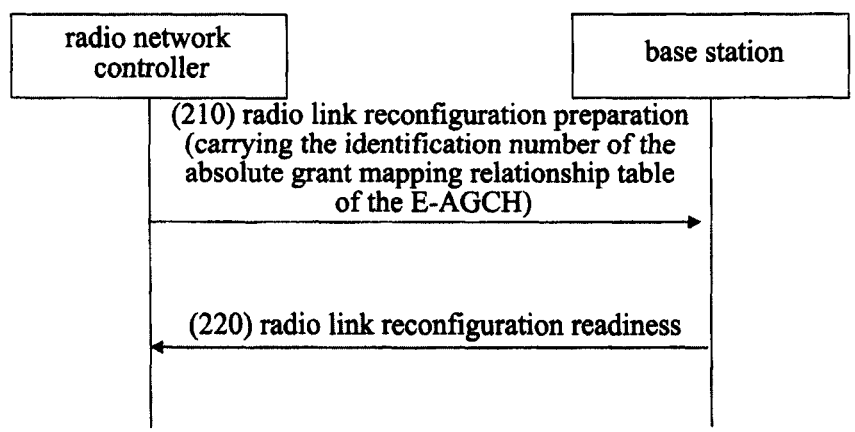
FIG. 2 illustrates a schematic diagram of a method for configuring an absolute grant mapping relationship table for a base station in accordance with the second embodiment of the present invention.

In this embodiment, a radio network controller notifies a base station of an absolute grant mapping relationship table usable by an E-AGCH through a radio link synchronous reconfiguration flow, as shown in FIG. 2:

step 210: the radio network controller sends a radio link reconfiguration preparation message, which carries the identification number of the absolute grant mapping relationship table usable by the E-AGCH, to the base station, where the identification number of the absolute grant mapping relationship table is consistent with that of an absolute grant mapping relationship table of which a user equipment is notified via the air interface to use; and step 220: the base station stores the configured information and sends a radio link reconfiguration readiness message to the radio network controller.

The Third Embodiment

Figure 3:
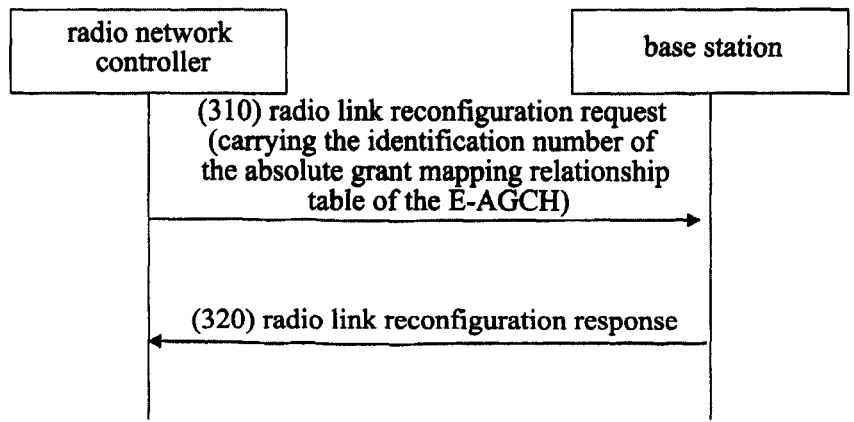
FIG. 3 illustrates a schematic diagram of a method for configuring an absolute grant mapping relationship table for a base station in accordance with the third embodiment of the present invention.

In this embodiment, a radio network controller notifies a base station of an absolute grant mapping relationship table usable by the E-AGCH through a radio link asynchronous reconfiguration flow, as shown in FIG. 3:

step 310: the radio network controller sends a radio link reconfiguration request message, which carries the identification number of the absolute grant mapping relationship table usable by the E-AGCH, to the base station, where the identification number of the absolute grant mapping relationship table is consistent with that of an absolute grant mapping relationship table of which a user equipment is notified via the air interface to use; and step 320: the base station stores the configured information and sends a radio link reconfiguration response message to the radio network controller.

Note that the absolute grant mapping relationship table described in all of the three embodiments may be the absolute grant mapping relationship table illustrated in Table 1 or Table 2, identification number of which may be set to 0 or 1, respectively.

INDUSTRIAL APPLICABILITY

The present invention is applicable to wireless communication systems such as WCDMA, TD-SCDMA, CDMA2000, Wimax, etc.

What We claim is:

1. A method for configuring an absolute grant mapping relationship table, comprising:
a radio network controller notifying the base station of the absolute grant mapping relationship table used by an enhanced dedicated channel absolute grant channel (E-AGCH) through a signaling, wherein the absolute grant mapping relationship table is consistent with an absolute grant mapping relationship table used by the E-AGCH, of which a user equipment is notified, and content of the absolute grant mapping relationship table includes two items: index numbers and the corresponding absolute grant values; and
the base station returning a response message to the radio network controller after storing the configured information,
wherein notifying the base station of the absolute grant mapping relationship table used by the E-AGCH is implemented by including an identification number of the absolute grant mapping relationship table in the signaling, and the identification number is used to identify the absolute grant mapping relationship table used by the user equipment.

2. The method according to claim 1, wherein the user equipment is notified via an air interface.

3. The method according to claim 1, wherein the signaling sent by the radio network controller is a radio link setup request message or a radio link addition request message, and the base station sends a radio link setup response message or a radio link addition response message to the radio network controller after receiving the radio link setup request message or the radio link addition request message.

4. The method according to claim 1, wherein the signaling sent by the radio network controller is a radio link reconfiguration preparation message, and the base station sends a radio link reconfiguration readiness message to the radio network controller after receiving the radio link reconfiguration preparation message.

5. The method according to claim 1, wherein the signaling sent by the radio network controller is a radio link reconfiguration request message, and the base station sends a radio link reconfiguration response to the radio network controller after receiving the radio link reconfiguration request message.

6. The method according to claim 1, wherein a value range of the identification number of the absolute grant mapping relationship table is 0~1.

7. The method according to claim 1, wherein the absolute grant mapping relationship table is an absolute grant value and index relationship table before or after the introduction of 16QAM.

* * * * *